Figure 1:
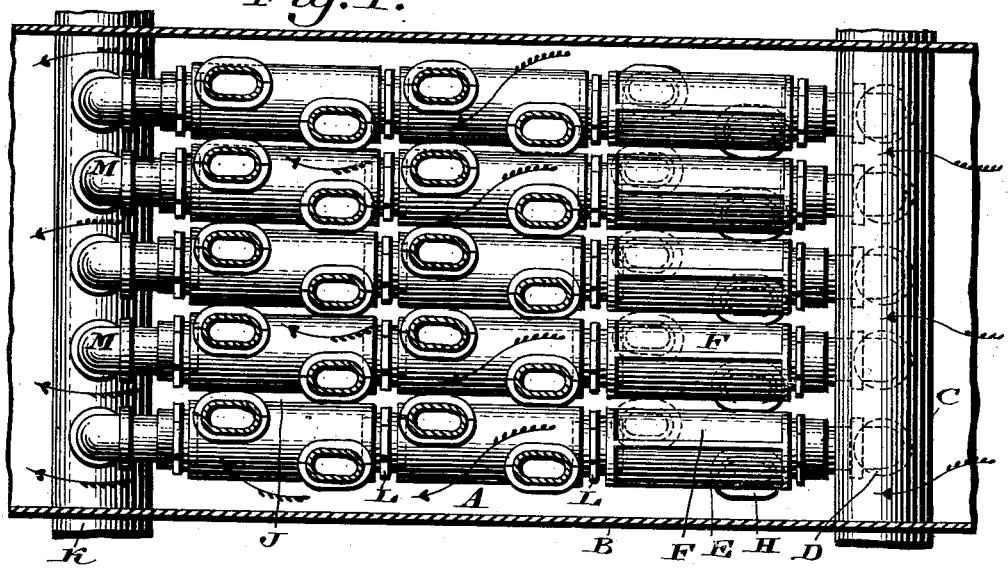

No. 608,352. Patented Aug. 2, 1898.
W. P. & R. P. THOMPSON.
RADIATOR FOR HEATING AIR.
(Application filed Feb. 5, 1898.)

(No Model.) 2 Sheets—Sheet 1.

WITNESSES:
P. F. Eagle.
L. Douville.

INVENTORS.
William P. Thompson.
Robert P. Thompson.
BY Wiedersheim & Fairbanks
ATTORNEYS.

THE NORRIS PETERS CO., PHOTO-LITHO., WASHINGTON, D. C.

No. 608,352. Patented Aug. 2, 1898.
W. P. & R. P. THOMPSON.
RADIATOR FOR HEATING AIR.
(Application filed Feb. 5, 1898.)

(No Model.) 2 Sheets—Sheet 2.

WITNESSES:
P. H. Eagle
L. Douville

INVENTORS
William P. Thompson
Robert P. Thompson
BY
Wiedersheim & Fairbanks
ATTORNEYS.

THE NORRIS PETERS CO., PHOTO-LITHO., WASHINGTON, D. C.

UNITED STATES PATENT OFFICE.

WILLIAM P. THOMPSON AND ROBERT P. THOMPSON, OF PHILADELPHIA, PENNSYLVANIA.

RADIATOR FOR HEATING AIR.

SPECIFICATION forming part of Letters Patent No. 608,352, dated August 2, 1898.

Application filed February 5, 1898. Serial No. 669,173. (No model.)

*To all whom it may concern:*

Be it known that we, WILLIAM P. THOMPSON and ROBERT P. THOMPSON, citizens of the United States, residing in the city and county of Philadelphia, State of Pennsylvania, have invented certain new and useful Improvements in Radiators for Heating Air, which improvements are fully set forth in the following specification and accompanying drawings.

Our invention relates to radiators wherewith to heat air to be used for warming and ventilating the various apartments in buildings, said radiators being heated by an internal circulation of steam or hot water and the air being heated by passing over and in contact with the external surface of the radiators; and our invention relates more particularly to that form of heater wherein the radiators are massed within a casing or chamber and the air-currents forced through the same by a fan, blower, or other similar device, becoming heated in their passage, and thence distributed through pipes or ducts to the various parts of the building.

The object of our invention is to provide a radiator of such form and construction that with its connecting parts it will be more easily and cheaply made, can be more quickly and readily assembled, and one which will when massed for use provide for a more prompt displacement of air from its interior, a shorter and more complete drainage and more thorough circulation, a more even distribution of the heating medium throughout the cross-section of the inclosing casing or chamber, afford an option of directing the internal current either in a direction similar to that of the external air-current or in a contrary direction, so that the air as it becomes warmer will come in contact with still hotter surfaces or the reverse, as may be found to best suit the economical use of the apparatus and insure the shortest line of flow between the supply and receiving headers or manifolds, so that damage to any one line of radiators by which it is thrown out of service causes the least possible decrease of effectiveness and loss of time from stoppage for repairs.

It further consists of novel details of construction, all as will be hereinafter fully set forth, and particularly pointed out in the claims.

Figure 2:
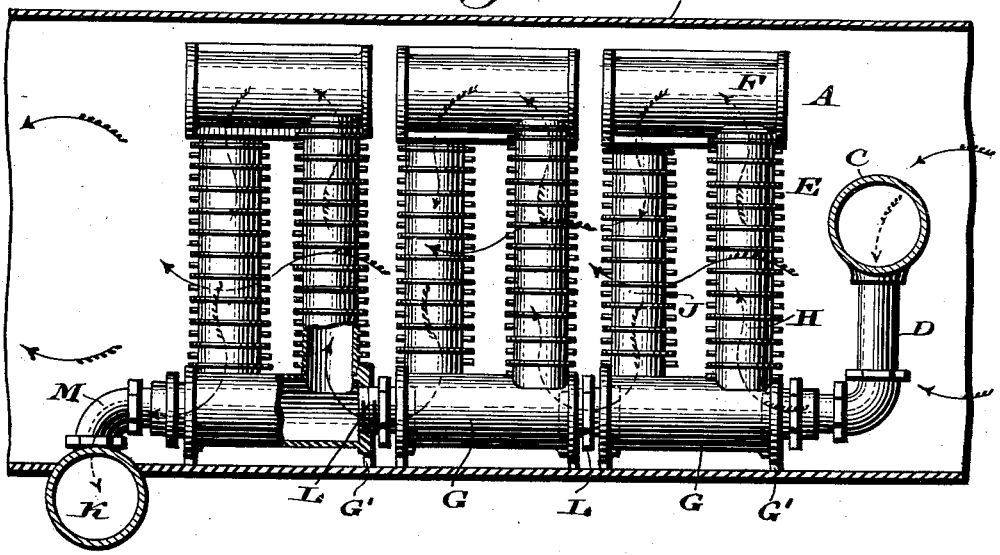
Figure 5:
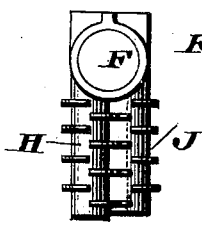
Figure 3:
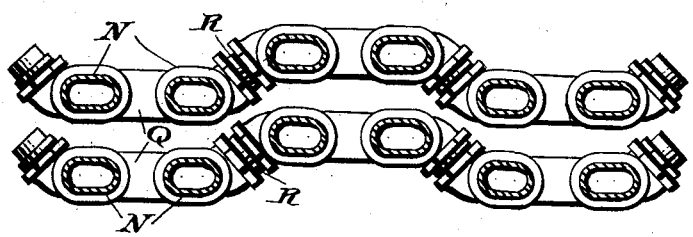
Figure 4:
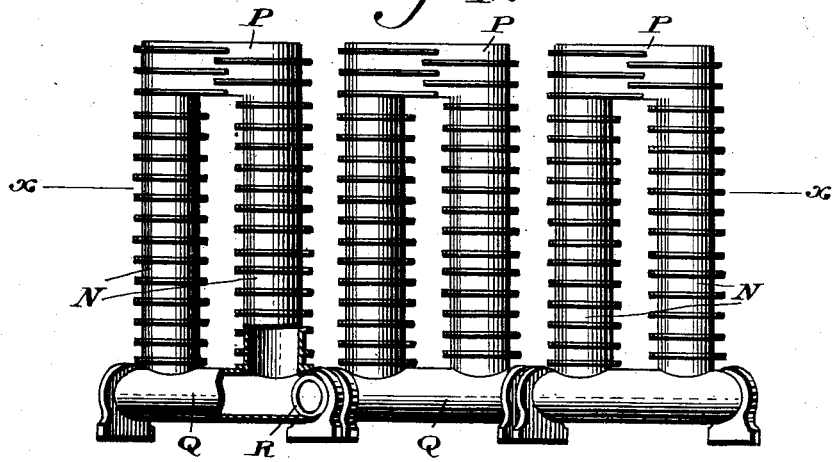
Figure 6:
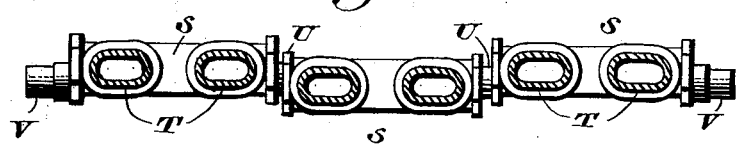

Figure 1 represents a plan view of a heater composed of radiators embodying our invention, a portion of the radiators being in section. Fig. 2 represents a side elevation of the same, a portion of the apparatus being in section. Fig. 3 represents a plan view, partly in section, on line $xx$, Fig. 4, showing a modified form of radiators as assembled for use. Fig. 4 represents a side elevation, partly in section, of the radiator seen in Fig. 3. Fig. 5 represents an end elevation of a portion of Fig. 2. Fig. 6 represents a sectional plan view of a modified form of radiator.

Similar letters of reference indicate corresponding parts in the figures.

Referring to the drawings, A designates radiators, the same being inclosed in the casing B, into which air is adapted to be conducted, the course of the air therethrough being indicated in full lines.

C designates the steam-supply header or manifold, the latter having the connections D leading therefrom to the radiator-sections E, which consist of the upper and lower headers F and G, which are hollow or tubular in shape and are joined by the upright tubes H and J, which are arranged in staggered order or out of alinement with each other, said tubes being flattened on their sides and having projecting flanges to insure the greatest amount of external surface with the least amount of metal.

Each of the top headers are shaped so as to afford a suitable support for other radiators, which may be superimposed thereupon either by extending each singly or by a duplication of the series, including the connection and manifolds.

The bottom headers have suitable feet, ribs, or faces G' for supporting the radiator in its place on the floor or bottom of the casing B, and each end of the bottom headers has an opening suitably prepared for connecting it with the adjoining radiators in its line or with the steam-supply or condense-receiving header or manifold K, the latter being connected to the external radiator-section, as is evident.

Each of the radiator-sections have their lower headers connected by means of the nipples L, the construction of the latter being understood from the lower left-hand portion of Fig. 2. The header K receives the condensed steam or cooled water from the various radiator-sections by means of the connections M, said water being conducted thence to any suitable point, the course of the steam-current through the interior of the radiators being indicated by dotted arrows. The upright tubes H and J may be staggered or offset, as indicated in Figs. 1, 2, and 5, or they may be in substantially the same plane as shown in Figs. 3 and 4, said tubes being now designated as N and provided with the upper and lower headers P and Q, respectively.

When the tubes N are set in the same plane on the headers, it is preferable to locate the opening in the headers at an angle to the vertical plane, so that the radiator-sections themselves can be staggered or offset and the most efficient results attained in heating the air passing over and through the radiator-sections, the lower portions of the latter being connected by the nipples R.

In Fig. 6 we show another embodiment of the principle of our invention, S designating the headers having the upright tubes T, which are of substantially the same general contour as the tubes H, J, and N, it being noted that said headers are set out of alinement with each other and connected by the nipples U, while the external nipples V are also preferably offset from the central line of their headers, as will be understood from Fig. 6.

It will be evident from the foregoing that by assembling the radiator-sections in the manner described we obtain a maximum heating-surface and that, furthermore, every portion of the latter is so located in the path of the incoming air-currents as to most effectively heat the latter, and thus utilize all the heat units.

It will of course be understood that the front and rear manifolds C and K can be employed in the construction seen in Figs. 3 to 6, inclusive, if desired.

Having thus described our invention, what we claim as new, and desire to secure by Letters Patent, is—

1. In a heating system, the combination of two headers, one for distributing steam to a radiator and the other for receiving the water of condensation therefrom, a radiator comprising a series of sections connected together longitudinally of each other and each consisting of two headers arranged one above the other and connected together by radiating-tubes, the tubes being arranged on opposite sides of the longitudinal axis of said series of sections, and a casing surrounding the radiator.

2. In a radiator for heating air, the combination of upper and lower headers, upright tubes common to said headers, the latter being arranged longitudinally but out of alinement with each other, whereby certain of said tubes are arranged in staggered order, front and rear manifolds having connections therefrom to the front and rear headers and an inclosing casing.

3. In a radiator for heating air, the combination of upper and lower headers, upright tubes common to said headers, the latter being arranged longitudinally but out of alinement with each other, whereby certain of said tubes are arranged in staggered order, nipples connecting said lower headers and engaging openings suitably prepared at angles to the vertical plane thereof, front and rear manifolds having connections therefrom to the front and rear headers and an inclosing casing.

WILLIAM P. THOMPSON.
ROBERT P. THOMPSON.

Witnesses:
JOHN A. WIEDERSHEIM,
WM. C. WIEDERSHEIM.